United States Patent Office 3,045,718
Patented July 24, 1962

3,045,718
RACKING HEADS FOR FILLING
PRESSURE CASKS
John Edwin Reeve, London, England, assignor to G. Hopkins & Sons Limited, London, England, a company of Great Britain
Filed May 5, 1960, Ser. No. 27,000
4 Claims. (Cl. 141—37)

This invention relates to improved racking heads for filling pressure casks with liquid and at the same time permitting the passage of gas used for placing the liquid in the cask under pressure. The object of the invention is to provide a racking head which will accurately engage a valve irrespective of the relative angular axial displacement of the two co-operating members.

According to the invention a racking head for use in filling metal pressure casks e.g. with carbonated liquor and wherein an independent passage is provided for gas and for the liquor characterised in that the passages are arranged concentrically and means are provided whereby said passages are opened to pass gas and liquid respectively upon application of the racking head to the valve of a cask.

In order that the invention may be clearly understood and readily carried into effect, reference is directed to the accompanying drawings wherein—

Figure 1:
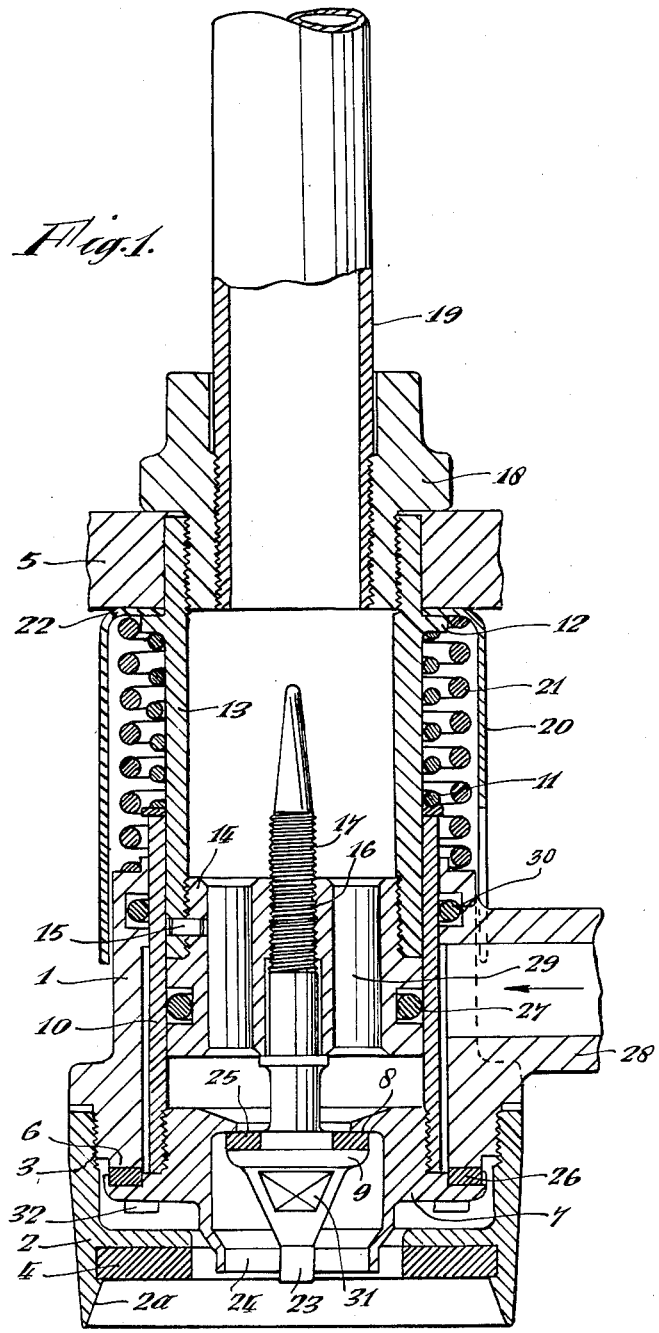
Figure 2:
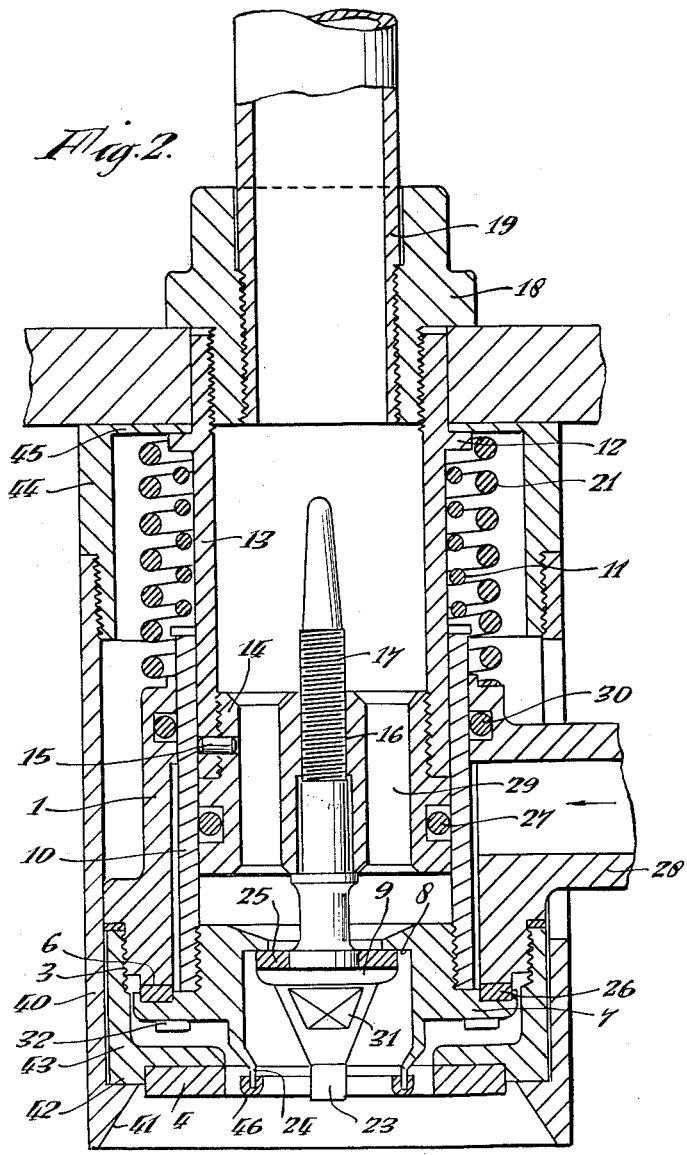

FIGURE 1 shows in sectional elevation a racking head according to the invention and FIGURE 2 shows in sectional elevation a modified form of racking head according to the invention.

Referring firstly to FIGURE 1 of the drawings, the racking head illustrated comprises a valve body 1 provided with a head 2 screwthreaded thereto as at 3 and provided with a sealing washer 4 to make sealing engagement with the rim of a valve on pressure being applied to the assembly by means of an actuating member 5. Location with the cask valve is facilitated by the centering cone 2a. The valve body is of cylindrical form and provides a peripheral seating 6 for a gas valve member 7 in turn providing a seating 8 for a liquid valve member 9 all of which are concentrically arranged. The gas valve member 7 is in screwthreaded engagement with one end of an outer sleeve 10 slidable in the valve body 1 against the loading of a spring 11 which bears at its upper end against a shoulder 12 provided on an inner main sleeve 13. The inner sleeve 13 is screwed to a spider 14 and fixed by a pin 15, the spider being screwthreaded at 16 to carry the valve stem 17 of the liquid valve member 9. The upper end of the inner sleeve 13 is screwthreaded to a bushing 18 to which is connected a liquid supply pipe 19. The inner main sleeve 13 is fitted with a cap 20 which encloses a spring 21, the pressure of which against the valve body 1 and an inturned edge 22 of the cap 20 maintains the valves 7 and 9 closed on their seatings. The collar 5 is located in place by the bushing 18. The liquid valve member 9 is provided with a pin extension 23 and the gas valve member 7 is provided with a circular rim extension 24. The extensions 23 and 24 serve to open the liquid and gas passages respectively of a pressure cask valve such as described in the aforesaid co-pending application for patent. The liquid valve member has a seating valve washer 25 and the gas valve member a valve washer 26 respectively. Rubber sealing rings 27 and 30 are fitted in the spider 14 and valve body 1 respectively to ensure a sliding seal between the spider and body and the sleeve 10 with which they are in sliding engagement. 28 is a gas inlet to the racking head.

The valve 9 is provided with flats 31 to engage a suitable key spanner. The valve stem 17 is sufficiently long to engage the spider 14 when springs 11 and 21 are freely extended. Removal of valve 9 enables all parts in contact with liquid or gas to be readily removed for cleaning.

The spider 14 is provided with passages 29 for the through flow of liquid.

FIGURE 2 illustrates a modified construction or racking head wherein the head comprises a sleeve 40 provided with a centering cone 41 having an internal shoulder 42 to engage a member of annulus form 43 screwed to the valve body 1, the annulus member 43 having attached thereto a sealing ring 4 as before. The sleeve is screwthreaded to connect with a tubular member 44 internally flanged as at 45 for clamping between the shoulder 12 and the actuating member 5. The sleeve 40 and part 44 are thus fixed in relation to the movable inner parts of the racking head whereas in the previously described construction the racking head 2 was movable when brought into contact with a cask to be filled and unless the cask was accurately centered, the valve thereof could be inadvertently opened before the racking head was accurately mated therewith, whereas with the modified construction the part 40 being fixed, its coned entry end serves to accurately locate the cask before the cask or racking head valves can be opened. With the modified as with the original construction the rim extension 24 is preferably provided with a sealing ring 46 of U-shape cross-section.

In operation of the first described form of racking head, the head 2 is applied to a valve in sealing engagement and continued pressure will move downwardly the main sleeve 13 together with the spider 14 which carries with it the liquid valve member 9 and the gas valve member 7 to remove it from its seating 6 and allow the passage of gas to or from the gas inlet 28 through the head 2 from or to the cask valve, the gas valve member of which is opened by the rim extension 24.

This movement will continue until the stops 32 attached to gas valve member 7 contact the head 2, relative movement compressing the spring 21. Further movement of the main sleeve 13 downwardly will remove valve 9 from its seating 8 and the pin extension 23 will open the liquid valve member of the cask valve, thus admitting liquid from the supply pipe 19 through the passages 29 and into the cask, relative movement compressing both springs 11 and 21.

Two distinct concentric ways are thus provided for the gas and liquid respectively, the one being sealed from the other by the engagement of the rim 24 with the cask valve. The springs 11 and 21 serve to return the parts to the closed position when the racking head is retracted and to provide the necessary sealing pressure to washer 4 and rim 24.

The operation of the second described form of racking head is similar except that after the mating of the head with the valve of a cask, the operation is effected by pressure on the parts 4 and 43, the sleeve 40 having no direct effect on the opening of the valve members 7 and 9.

What I claim and desire to secure by Letters Patent is:

1. A racking head for use in filling metal pressure casks, with carbonated liquor and wherein an independent passage is provided for gas and for the liquor, comprising a cylindrical valve body, a head therefor adapted to make sealing engagement with the rim of a valve on a pressure cask, an internal peripheral seating on said valve body, a gas valve member adapted to engage said seating, an outer sleeve slidable in said valve body and having screwthreaded engagement at one end with said gas valve member, a spring to apply loading to said outer sleeve, an inner sleeve slidable in engagement with said outer sleeve, said inner sleeve having a shoulder against which the other end of said spring abuts, a seating on said gas valve member, a liquid valve member secured to said inner sleeve and adapted to engage said seating on said gas valve member, the passages between said seatings and said valve members being arranged concentrically, said passages being opened automatically to pass gas and liquid respectively upon application of the racking head to the valve on said pressure cask.

2. A racking member as claimed in claim 1 wherein the gas valve member is in screwthreaded engagement with one end of an outer sleeve slidable in the valve body against the loading of a spring and bearing at its upper end against a shoulder provided on an inner main sleeve.

3. A racking head as claimed in claim 2 wherein the inner sleeve is screwed to a spider arranged to carry the valve stem of the liquid valve member, the upper end of the inner sleeve being screwthreaded, and a liquid supply pipe connected thereto.

4. A racking head as claimed in claim 3 wherein the liquid valve member is provided with a pin extension and the gas valve member is provided with a circular rim extension, said extensions serving to open the liquid and gas passages respectively of a pressure cask valve.

References Cited in the file of this patent
UNITED STATES PATENTS

| 676,366 | Koch et al. | June 11, 1901 |

FOREIGN PATENTS

| 107,480 | Great Britain | July 5, 1917 |
| 443,063 | Germany | Apr. 23, 1927 |
| 684,483 | Germany | Nov. 29, 1937 |
| 693,870 | Germany | July 20, 1940 |